United States Patent
Connelly et al.

(10) Patent No.: US 6,459,953 B1
(45) Date of Patent: Oct. 1, 2002

(54) REPLY MAIL PROCESSING SYSTEM

(75) Inventors: Martin A. Connelly, Orange, CT (US); Robert V. Ferrara, Mamaroneck, NY (US); Ronald K. Rutledge, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/626,953

(22) Filed: Jul. 27, 2000

(51) Int. Cl.[7] .................................................. G06F 7/00
(52) U.S. Cl. ...................................... 700/224; 700/226
(58) Field of Search ................................. 700/223, 224, 700/225, 226; 209/564, 583, 584, 900

(56) References Cited

U.S. PATENT DOCUMENTS

| | | | |
|---|---|---|---|
| 5,169,061 A | | 12/1992 | Buescher ..................... 229/305 |
| 5,420,403 A | | 5/1995 | Allum et al. ................. 235/375 |
| 5,459,670 A | | 10/1995 | Johnson et al. .............. 364/478 |
| 5,749,473 A | * | 5/1998 | Yamashita et al. ....... 209/584 X |
| 5,901,855 A | * | 5/1999 | Uno et al. ............... 209/584 X |
| 5,990,438 A | * | 11/1999 | Yamashita et al. ....... 209/584 X |
| 6,054,666 A | * | 4/2000 | Yamashita et al. ...... 209/583 X |
| 6,107,589 A | * | 8/2000 | Yamashita et al. ...... 209/584 X |
| 6,112,193 A | * | 8/2000 | Dlugos et al. ........... 705/408 X |
| 6,166,346 A | * | 12/2000 | Yamashita et al. ...... 209/584 X |
| 6,233,168 B1 | | 4/2001 | McGurl et al. ................ 705/40 |
| 6,260,762 B1 | | 7/2001 | Lohmann ............... 235/462.08 |

* cited by examiner

Primary Examiner—Christopher P. Ellis
Assistant Examiner—Gene O. Crawford
(74) Attorney, Agent, or Firm—Brian A. Lemm; Angelo N. Charles; Charles R. Malandra, Jr.

(57) ABSTRACT

A business reply mail processing system includes a transport module, a scanner module and a control module in operative communication with the scanner module. The transport module feeds a business reply mail piece in a path of travel where the business reply mail piece includes a job ID code and field data. The scanner module is located adjacent to the path of travel for scanning the business reply mail piece reading the job ID code and the field data. The control module includes a mail campaign job database. The control module uses the job ID code to access processing data from the mail campaign job database corresponding to the job ID code and controls the scanner module using the processing data to read the field data from the business reply mail piece.

18 Claims, 7 Drawing Sheets

REPLY MAIL PROCESSING SYSTEM

FIELD OF THE INVENTION

This invention relates generally to mail handling systems. More particularly, in the preferred embodiments, this invention is directed to system and method for processing business reply mail in an efficient manner to obtain the information they contain.

BACKGROUND OF THE INVENTION

Many companies and private concerns use business reply mail to solicit information and responses from the recipients of the business reply mail. As such, business reply mail has a wide variety of uses and is often customized depending upon the needs of the sender. A few examples of the uses for business reply mail are: subscription solicitations, information request responses, proxy statement responses, remittance documents (invoices for payment due) and the like. Oftentimes, the business reply mail is provided to recipients as part of an direct mail campaign, an invoice or as a detachable insert in a periodical magazine or newsletter.

In a large business reply mail communication program, tens of thousands and even hundreds of thousands of pieces may be distributed. This means that eventually these business reply mail pieces must be received and processed. Typically, some smaller companies cannot afford or cost justify automated systems to collect and process the business reply mail because such systems may have long idle periods. Therefore, these companies utilize manual techniques for the handling of the business reply mail and the associated data entry. The result is a time consuming and costly process that is susceptible to human error. On the other hand, large companies expend considerable resources using dedicated equipment that has been customized for a particular business reply mail processing application. Although these systems work generally well, they are not flexible to accommodate the needs of different business reply mail processing applications and require manual presorting of the business reply mail into batches of like kind prior to processing. This is particularly cumbersome and inefficient when it is desired that each business reply mail piece be processed the very same day that it is received.

Therefore, the large volume of business reply mail handled today has created the need for improved systems capable of processing large volumes of business reply mail to rapidly acquire the information that each reply mail piece contains and initiate appropriate follow up activity. Furthermore, there is a need for a flexible system that can accommodate the requirements of different business reply mail processing applications without undue costs and delays due to customization and setup.

SUMMARY OF THE INVENTION

The present invention provides a business reply mail processing system, a method of processing business reply mail and a data structure for use in processing business reply mail. Generally, this is accomplished by organizing information associated with different mail campaigns into respective job data sets and using the job data sets to process the business reply mail pieces.

In accordance with the present invention, there is provided a business reply mail processing system includes a transport module, a scanner module and a control module in operative communication with the scanner module. The transport module feeds a business reply mail piece in a path of travel where the business reply mail piece includes a job ID code and field data. The scanner module is located adjacent to the path of travel for scanning the business reply mail piece reading the job ID code and the field data. The control module includes a mail campaign job database. The control module uses the job ID code to access processing data from the mail campaign job database corresponding to the job ID code and controls the scanner module using the processing data to read the field data from the business reply mail piece.

In accordance with the present invention, a method of operating the business reply mail processing system, a data structure (memory device) and a business reply mail piece are also provided.

Therefore, it is now apparent that the present invention substantially overcomes the disadvantages associated with the prior art. Additional advantages of the invention will be set forth in the description that follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

FIG. 2D is an example of a fourth business reply mail piece that exists in the prior art.

DETAILED DESCRIPTION OF THE PREFERRED EMBODIMENTS

Figure 1:
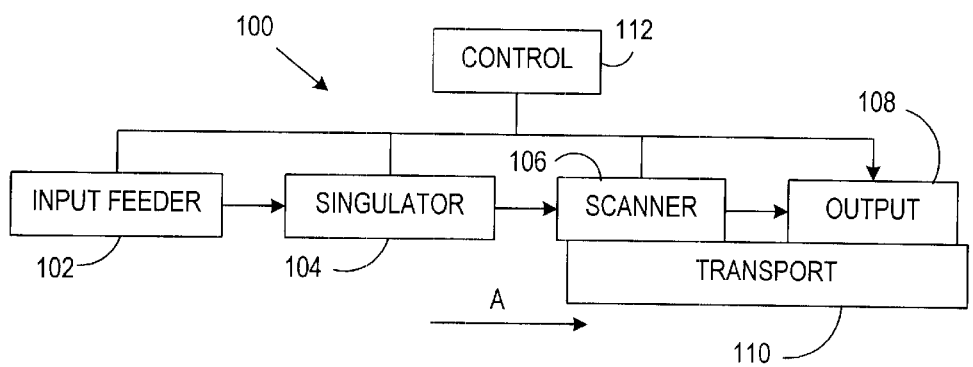
FIG. 1 is a simplified schematic representation of a business reply mail processing system in accordance with the present invention.
Figure 2A:
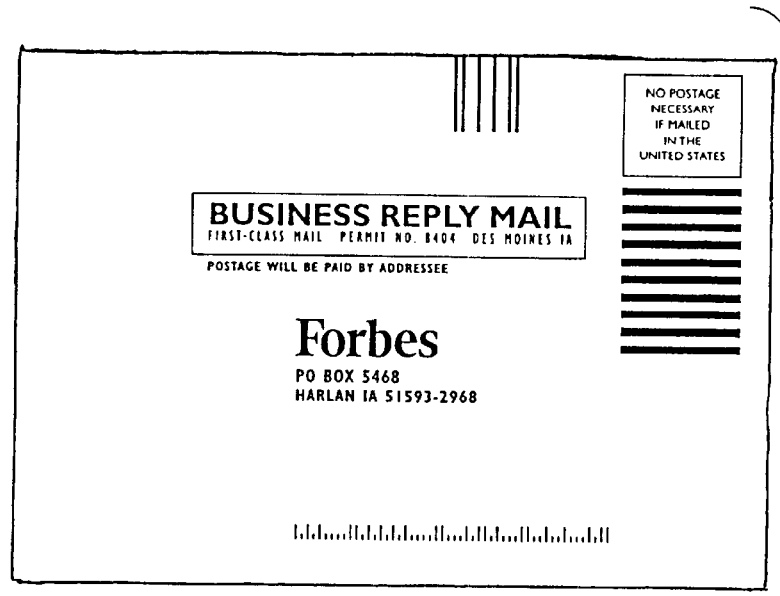
FIG. 2A is an example of a first business reply mail piece that exists in the prior art.
Figure 2A:
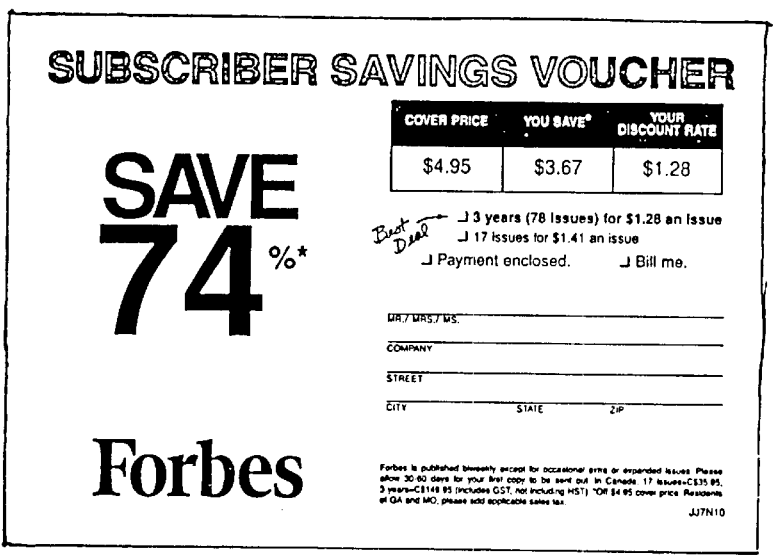
Figure 2B:
FIG. 2B is an example of a second business reply mail piece that exists in the prior art.
Figure 2B:
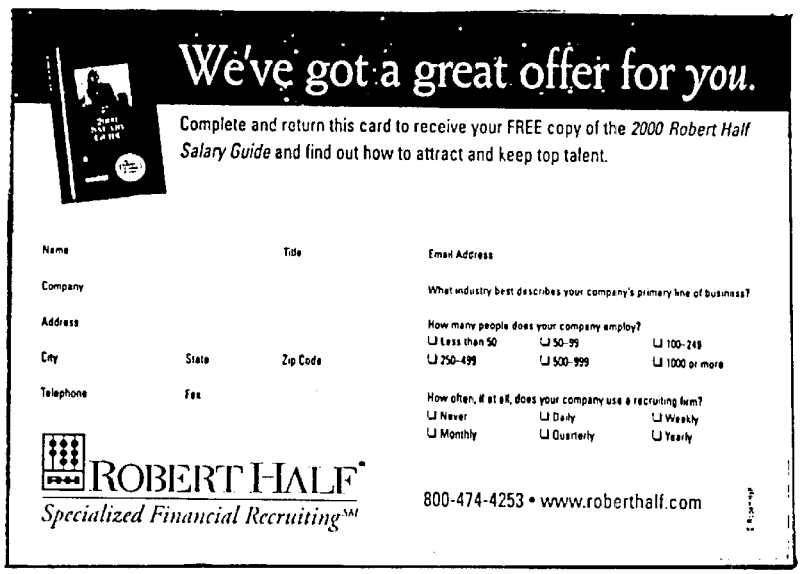
Figure 2C:
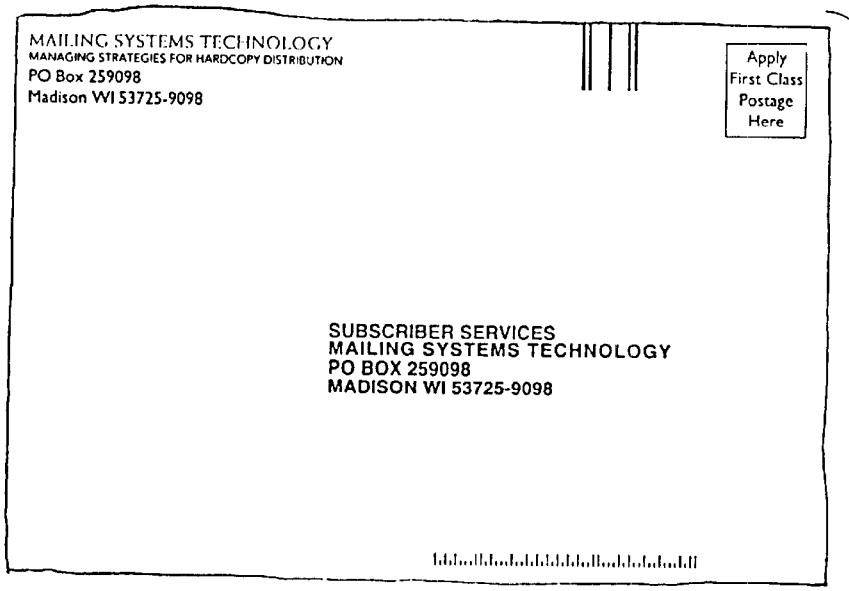
FIG. 2C is an example of a third business reply mail piece that exists in the prior art.
Figure 2D:
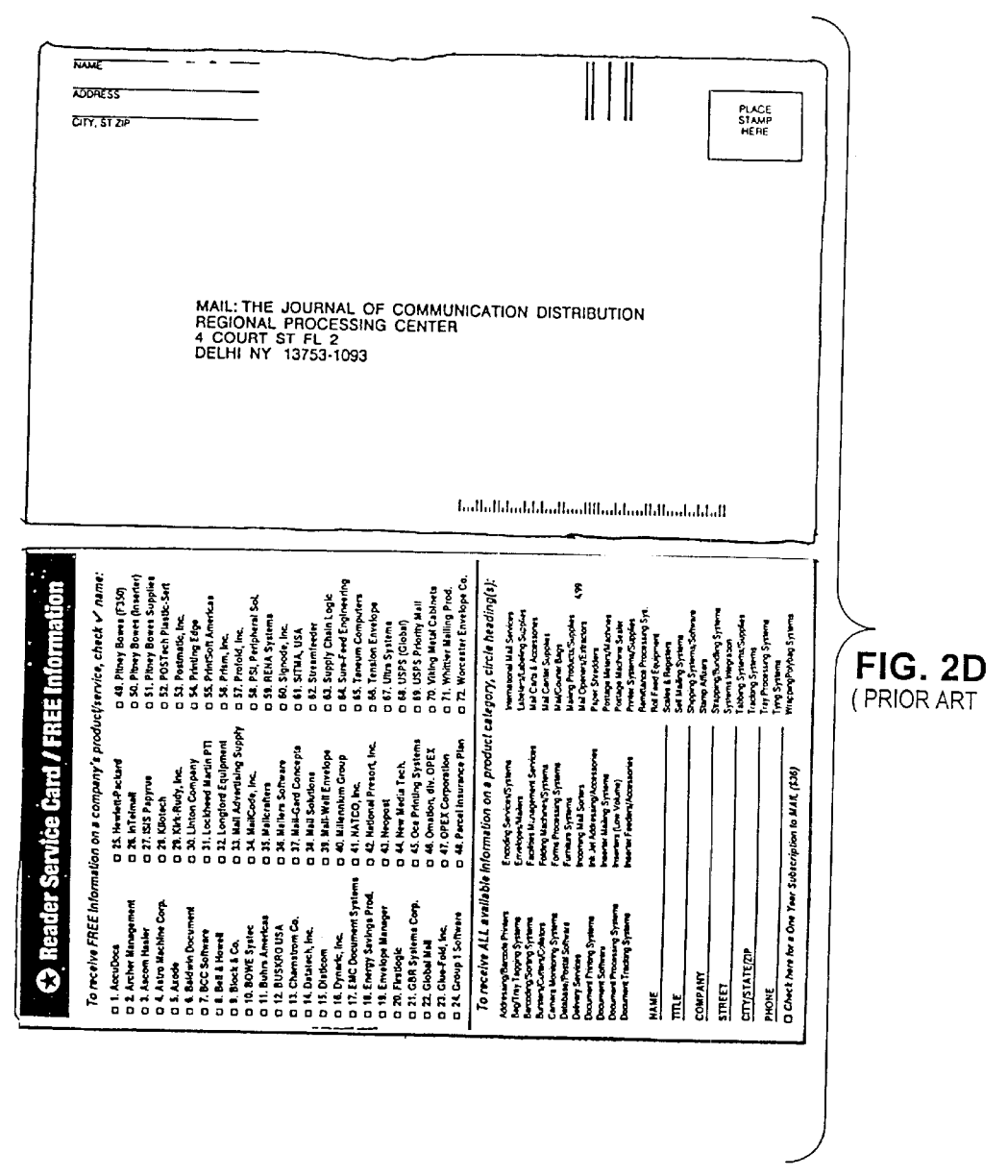

Referring to FIG. 1, a business reply mail processing system 100 in which the present invention may be incorporated is shown. The processing system 100 includes a plurality of modules that perform various functions on the mail pieces (not shown) as they are fed through the system 100 in a path of travel as indicated by arrow A. Referring to FIGS. 2A, 2B, 2C and 2D, examples of various types of business reply mail pieces in the prior art are shown. Although FIGS. 2A, 2B, 2C and 2D all show post card type business reply mail pieces, those skilled in the art will recognize that the business reply mail piece may also be an envelope along with its contents. Also, FIGS. 2A 15 and 2B show business reply mail pieces where postage has been pre-paid, while FIGS. 2C and 2D show business reply mail pieces that require the recipient to pay for postage. As described above, the business reply mail pieces are generally distributed as enclosures or attachments to other outgoing mail pieces (not shown) generated by the mail campaign sender. Referring again to FIG. 1, the processing system 100 includes an input feeder module 102, a singulator module 104, a scanner module 106, an output module 108, a transport module 110 and a control module 112. Generally, the plurality of modules are under the control of the control module 112.

Bundles of mail pieces (not shown), such as: business reply cards, post cards, and the like, are loaded by an operator into the processing system 100 at the input feeder module 102. The input feeder module 102 advances the mail pieces toward the singulator module 104 where the mail pieces are separated and fed one-by-one (one at a time) to the transport module 110. Preferably, the input feeder module 102 and the singulator module 104 are of a type that can handle mail pieces of mixed size, thickness and weight, such as the one described in U.S. Pat. No. 4,978,114, entitled REVERSE BELT SINGULATING APPARATUS or the one described in U.S. Pat. Ser. No. 6,276,679, entitled FLOATING IDLER PULLEY RETARD SYSTEM FOR MIXED MAIL SEPARATION, the disclosures of which are both specifically incorporated herein by reference. This capability is important because it is largely anticipated that the mail pieces received at a central location are part of different mail campaigns. Therefore, to avoid the time delay and cost associated with presorting the mail pieces, the ability to handle mixed mail is highly desirable.

Once singulated, the mail pieces are advanced along the path of travel through the remaining modules of the processing system 100 by the transport module 110. The scanner module 106 is positioned adjacent to the path of travel so that mail pieces may be scanned and/or imaged as they are fed downstream in the path of travel. Preferably, the scanner module 106 includes a scanner on each side of the path of travel so that: (i) both sides of the mail piece may be scanned, if necessary; and/or (ii) depending upon the orientation of the mail piece, information from the side of the mail piece requiring scanning may be scanned in the event that only one side of the mail piece requires scanning. Generally, any conventional scanner, whether based on laser, CCD or some other technology, may be employed, such as those provided by Symbol Technologies, Inc. of Long Island, N.Y.

Following scanning, the mail pieces are further fed by the transport module 110 to the output module 108. The output module 108 includes a plurality of output bins (not shown) for collecting the mail pieces that have been properly processed and an outsort bin for mail pieces that cannot be properly read via machine reading techniques. The plurality of output bins are provided so that like mail pieces may be collected together for ease of removal by the operator and for ease of separating the mail pieces of different mail campaigns. Generally, the output module 108 may be of any conventional design, such as the one described in U.S. Pat. No. 5,368,287, entitled INTELLIGENT TRAYER FOR INSERTER, the disclosure of which is specifically incorporated herein by reference.

As discussed above, the control module 112 serves to coordinate activities among the various modules of the processing system 100. Generally, the control module 112 provides for the smooth operation of the processing system 100 according to the introductory discussion provided above and the further detailed discussion provided below. Also, the control module 112 serves as an interface with the operator by providing messages to and receiving input from the operation. As a result, the control module preferably includes a display (CRT, LCD, or the like) (not shown) and an input device (keypad, keyboard, touch screen, mouse, or the like) (not shown). Therefore, those skilled in the art will recognize that the control module 112 may employ any suitable combination of computer hardware and software to facilitate the operation, storage, access and processing of information and various other computer based communications that are required as described above and in greater detail below.

Figure 3:
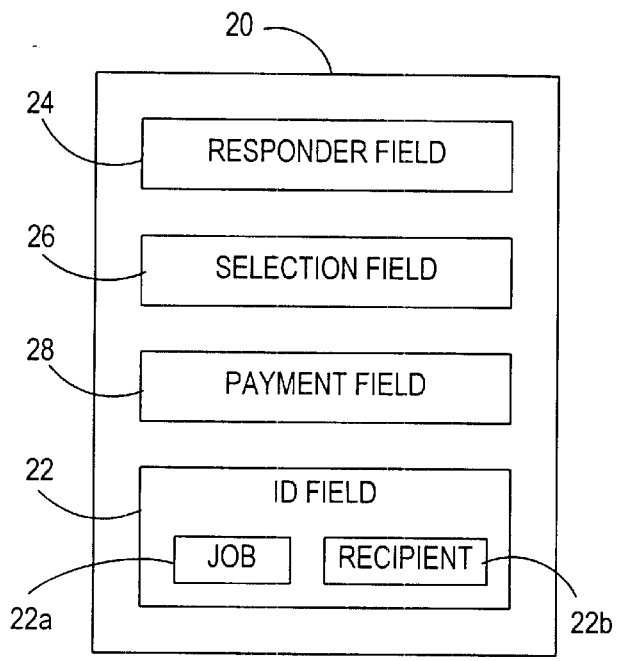
FIG. 3 is a simplified schematic representation of a business reply mail piece in accordance with the present invention.

Referring to FIG. 3, a simplified schematic representation of a business reply mail piece (BRMP) 20 in accordance with the present invention is shown. For the sake of brevity and clarity, it is assumed that only one side of the BRMP 20 contains data requiring scanning and this side is the one shown. For example, the other side (not shown) of the business reply mail piece 20 is preferably the one with the postal delivery address and postage payment information. The BRMP 20 includes field data, such as: an identification (ID) field 22, a responder identification field 24, a responder selection field 26 and a payment field 28. Generally, the ID field 22 assists the processing system 100 in recognizing the different mail campaigns that may exist and provides the key for how the scanning and/or imaging of the BRMP 20 is to occur and what post processing activities should be conducted. As the scanner module 106 encounters each BRMP 20, the scanner module 106 searches for the ID field 22 first. In the most preferred embodiment of the present invention, the ID field 22 includes a job ID code 22a and a recipient ID code 22b. The job ID code 22a is a unique identifier that may be made up of any suitable alphanumeric string or any other conventional symbology sufficient to distinguish one mail campaign from another mail campaign. Those skilled in the art will recognize that the job ID code 22a may be printed/ placed on the BRMP 20 as traditional characters, in bar code format or any other conventional format that facilitates machine readability. As an additional option, the recipient ID code 22b may be utilized and is also a unique identifier (alphanumeric or otherwise) that distinguishes each recipient among the plurality of recipients of the mail campaign.

The responder identification field 24, the responder selection field 26 and the payment field 28 are previously designated areas of the BRMP 20 established by the mail campaign sender that are filled out by the responder. The responder identification field 24 allows the responder to identify him or her self by name, address and any other pertinent information to the mail campaign sender. It is important to note that the recipient ID code 22b may not match the responder because one individual may receive the BRMP 20 while a different individual may utilize it. The responder selection field 26 includes information and/or instructions provided by the responder that is particular to each mail campaign. The payment field 28 may or may not be included depending upon the subject matter and the requirements of the BRMP 20. The payment field 28 may include credit card information, a request for invoice or other billing/payment options. Those skilled in the art will recognize that due to the wide variety of business reply mail, the responder identification field 24, the responder selection field 26 and the payment field 28 may vary greatly from mail campaign to mail campaign. Also, the organization of the various fields 22, 24, 26 and 28 on the BRMP 20 has no bearing on the present invention.

Figure 4:
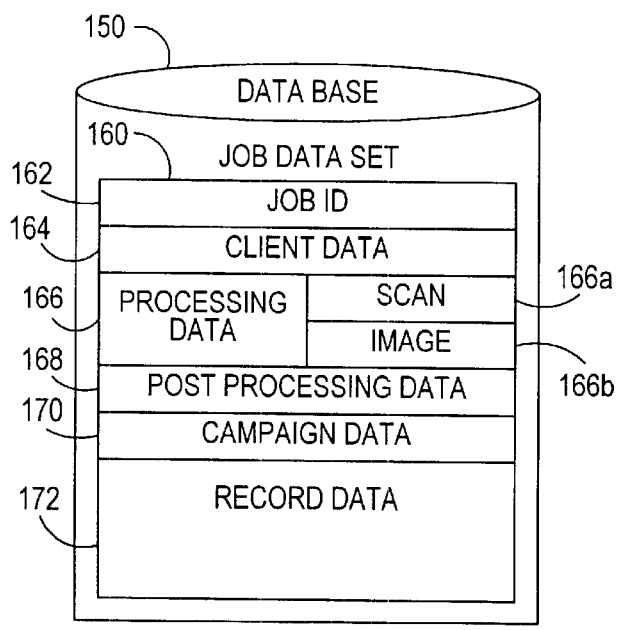
FIG. 4 is a simplified schematic representation of a database structure including information used to process business reply mail pieces and to initiate other post processing functions in accordance with the present invention.

Referring to FIG. 4 in view of FIGS. 1 and 3, a mail campaign job database 150, including a job data set 160, located within the control module 112 is shown. The database 150 may be operatively connected to the computer processing portion of the control module 112 in any conventional manner, such as: direct bus communication, local area network, wide area network, or the like. The database 150 may be implemented in any conventional computer storage technology comprising a suitable combination of computer memory devices and database management tools software. The database 150 includes a plurality of job data sets 160 that contain information and instructions pertaining to each mail campaign, respectively.

For the sake of clarity, the data structure associated with one job data set 160 has been shown. The job data set 160 includes a job ID code 162, client data 164, mail piece processing data 166, post processing data 168, mail campaign data 170 and record data 172. The job ID code 162 corresponds to the job ID code 22a located on the BRMP 20. In this manner, the processing system 100 may associate each BRMP 20 with a particular job data set 160. The client data 164 are an optional feature that includes contact information about the individual or organization responsible for the mail campaign identified by the job ID code 162. This may be most beneficial to those who operate the processing system 100 on a contract basis for a variety of different mail campaign senders. However, even large organizations that have captive clients may utilize this feature as well to identify different mail campaigns of the same sender. The processing data 166 includes scan instruction data 166a and image capture instruction data 166b. The scan instruction data 166a provides indications to the control module 112 where the responder field 24, the selection field 26 and the payment field 28 are located on the BRMP 20. Thus, the processing data 166 is utilized by the control module 112 to direct the scanner module 106 where to scan, what to scan, how (OCR, bar code, etc.) to scan, how to interpret the data read from the various field data 24, 26 and 28 from the business reply mail piece 20 and whether or not recipient ID codes 22b are present. The image capture instruction data 166b provides indications whether or not a graphical image of the BRMP 20 should be obtained, stored and in what format apeg, bit map, pdf, or the like). The post processing instruction data 168 provides indications of all the possible output activities, beyond the scanning and capture of information from the BRMP 20 that might possibly be taken based upon the field data 24, 26 and 28 supplied by each responder. As examples, the post processing data 168 may specify any of the following: customer care follow up activities, dispatch of requested materials to the responder; billing of the responders account, generation of reports for use by the mail campaign sender, and the like. Those skilled in the art will recognize that due to the wide range of business reply mail, the post processing options are quite varied and their exact makeup does not constitute part of the present invention. The campaign data 170 are optional features that may include information relating to the specific details of the mail campaign, such as: the number of BRMPs 20 that were sent. The record data 172 includes the information collected from the BRMPs 20. Preferably, the information associated with each BRMP 20 is stored in a respective record under the recipient ID code 22b. In the alternative, if the recipient ID code 22b and the responder field data 24 do not match, then the information associated with these BRMPs 20 is stored in a respective record under an indication of the responder field data 24.

Figure 5:
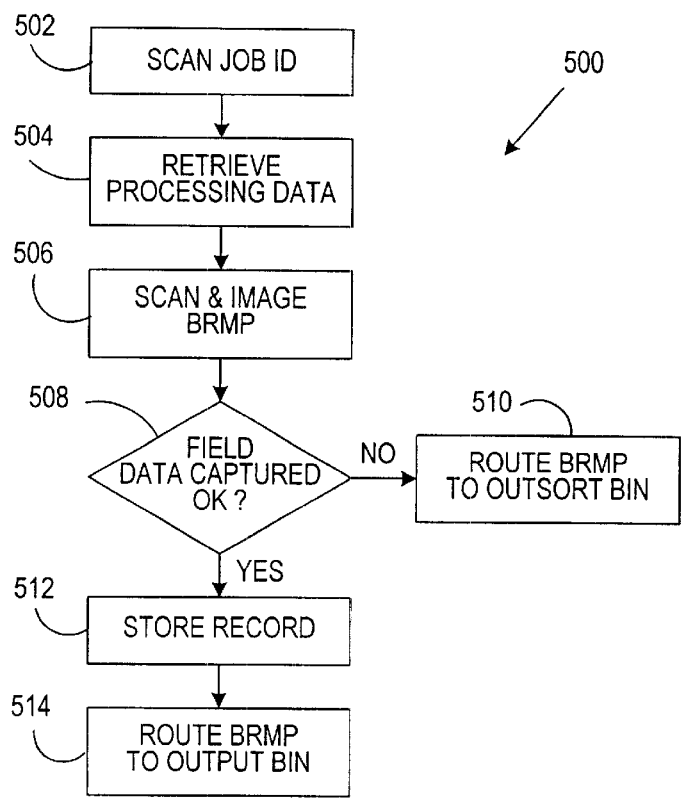
FIG. 5 is a schematic flow diagram of a data capture routine for processing of a business reply mail piece in accordance with the present invention.

With the structure of the business reply mail piece processing system 100 described as above, the operational characteristics will now be described. Referring primarily to FIG. 5 while referencing the structure of FIGS. 1, 3 and 4, a data capture routine 500 describing the operation of the processing system 100 is shown. Generally, the routine 500 commences when the scanner module 106 encounters a BRMP 20. Additionally, since it is anticipated that the business reply mail stream flowing through the processing system 100 will contain mail pieces 20 corresponding to different mail campaigns, the routine 500 will largely be run for each individual BRMP 20 without much variation. At 502, the scanner module 106 locates and scans the job ID code 22a from the BRMP 20. Here again, because of the mixed mail stream, it is easier to use the scanner module 106 to locate the job ID code 22a than to standardize the design of the BRMPs 20 and present them properly "faced" to the scanner module 106 for reading. However, those skilled in the art will recognize that alternative techniques exist. Next, at 504, once the job ID code 22a has been obtained, the control module 112 accesses the job data set 160 corresponding to the job ID code 22a and retrieves the processing data 166. Next, at 506, the control module 112 uses the processing data 166 to scan and image the BRMP 20 accordingly using optical character recognition (OCR) techniques or the like depending upon the form of data entry solicited from the responder. Next, at 508, a determination is made whether data obtained from the responder identification field 24, the responder selection field 26 and the payment field 28 has been reliably captured. If the answer is no, then at 510, the BRMP 20 is routed to the outsort bin (not shown) and no further processing occurs at this time. As an option, a human may read this out sorted BRMP 20 at a later time (or even real time at specially designed operator station) and enter its data manually into the processing system 100. On the other, if the answer is yes, then at 512 the data from the BRMP 20 is stored in a record contained within the job data set 160. As discussed above, the data is preferably associated with the responder field 24 information of the recipient ID code 22b, whichever best identifies the individual that filled out the BRMP 20. Next, at 514, as an additional optional feature, the BRMP 20 is routed to one of the plurality of the output bins (not shown) that has been designated to receive the BRMPs 20 associated with the scanned job ID code 22a. In this way, if the mail campaign sender desires that the BRMPs 20 be returned, the operator may simply forward the contents of the designated output bin without any manual sorting.

Figure 6:
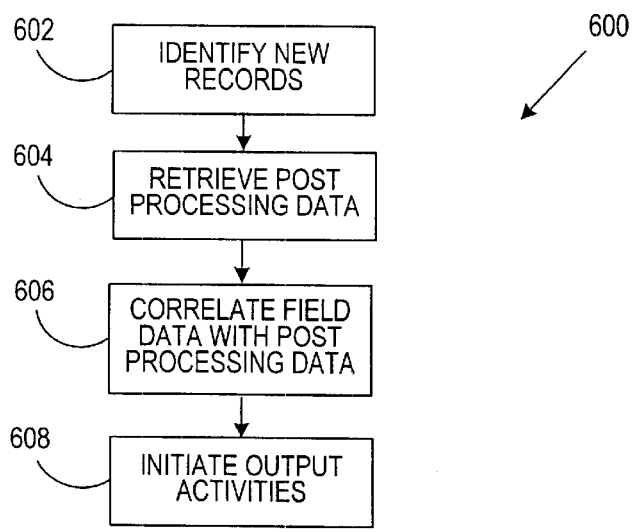
FIG. 6 is a schematic flow diagram of a post processing routine for initiating tasks beyond capturing of data contained on the business reply mail pieces in accordance with the present invention.

Referring primarily to FIG. 6 while referencing the structure of FIGS. 1, 3 and 4, a post processing routine 600 describing further operation of the processing system 100 for initiating tasks beyond the capturing of data describe about with respect to the data capture routine 500 is shown. Generally, in the most preferred embodiment, it is anticipated that the post processing routine 600 will be run in response to some predetermined periodic event, such as: the conclusion of processing of the BRMPs 20, the end of the day, after a given number of BRMPs 20 have been process, twice per day, or at some other convenient occasion. However, those skilled in the art will recognize that without much difficulty or variation, the post processing routine 600 may be executed real time following execution of the data capture routine 500 for each of the BRMPs 20. At 602, the control module 112 identifies the new records contained within the database 150 that have been updated since the previous post processing cycle was completed. Thus, each of the job data sets 160 is screened to look for new records in their respective record data 172. For the sake of clarity, the remaining discussion will focus on the post processing associated with one of the job data sets 160 and one new record. However, those skilled in the art will recognize that this same approach is duplicated for each of new records in the one job data set 160 and also for each of the job data sets 160 containing new records. Next, at 604, the post processing data 168 is retrieved. Generally, the post processing data 168 includes instructions for all the possible output activities, beyond the scanning and capture of information from the BRMP 20, that might possibly be taken based upon the field data 24, 26 and 28 supplied by the responder. Next, at 606, the field data 24, 26 and 28 is correlated with the post processing data 168 to determine which ones, if any, of the possible output activities have been triggered. Next, at 608, the control module 112 initiates the triggered ones of the possible output activities. For example, this may include: commencing billing of the responder, dispatching an instruction to provide goods and/or services to the responder, updating the responder's contact information, and the like.

Based on the above description and the associated drawings, it should now be apparent that the present invention improves many aspects of the processing of business reply mail by facilitating the handling of intermixed mail pieces and the organization of scanned information.

Many features of the preferred embodiment represent design choices selected to best exploit the inventive concepts as implemented in a particular business reply mail processing environment as pertaining to traditional response card type business reply mail. However, those skilled in the art will recognize that various modifications and adaptations can be made without departing from the spirit of the present invention. For example, if it is desired to store an image of the business reply mail piece 20 and destroy/recycle the business reply mail piece 20, then it may also be desirable to authenticate the image. Thus, the image may be secured by employing a suitable encryption technique. A digital signature, originating from a certificate authority such as Verisign Inc., of the image may be stored along with the image so that a high degree of confidence that the image has not been altered is achieved.

As another example, the report generation capabilities of the processing system 100 may be expanded. For each job ID code 160, a report may be automatically prepared following conclusion of the post processing activities indicating various information about the status of the mail campaign, such as: the number of business reply mail pieces 20 that have been processed since the last reporting period, the total number of business reply mail pieces 20 that have been processed, the types and distribution of output activities that have been taken, and the like.

As yet another example, if the business reply mail piece 20 includes a recipient ID code 22b, then further activities are possible. The campaign data 170 may be updated to indicate that this recipient's business reply mail piece 20 has been received. Also, the record associated with this recipient can be updated if the responder field data 24 indicates a new address or our other updated information It is also possible to integrate input from other response formats into the processing system 100. Thus, the responder may be given a variety of ways in which to communicate, such as: automated voice system, e-mail, fax, and the like. These response formats may be established so that they are also handled by the processing system 100 so that all modes of communication are integrated into a common processing system 100. The benefits are that the responder may select a preferred format for the business reply message (mail, phone, e-mail, fax, etc.). This may improve response rates.

As yet still another example, those skilled in the art will recognize that with only minor modifications, the processing system 100 may be adapted to be operated by the postal authority. In this manner, the BRMPs 20 are processed at various receiving postal facilities around the country and the BRMPs 20 are not even delivered. This saves the postal authority the expense of having to ship all of the BRMPs 20 associated with each of the various mail campaigns to their respective delivery addresses. Also, the mail campaign senders receive the information more quickly because the BRMPs 20 are processed upon deposit with the postal authority instead of having to wait until they are received at the delivery address.

Therefore, the inventive concept in its broader aspects is not limited to the specific details of the preferred embodiments described above, but is defined by the appended claims and their equivalents.

What is claimed is:

1. A system of construction comprising:
   (a) a first subassembly comprising a plurality of first subassembly structural members, each of said first subassembly structural members comprising:
      (i) a first subassembly first lengthwise side and an opposing first subassembly second lengthwise side, said first subassembly lengthwise sides being substantially parallel to each other and substantially equal in length,
      (ii) a first subassembly first widthwise side and an opposing first subassembly second widthwise side, said first subassembly widthwise sides being substantially parallel to each other and substantially equal in length;
      (iii) a first subassembly first planar side and a first subassembly second planar side, said first subassembly planar sides being substantially parallel to each other and defining a first subassembly thickness, said first subassembly thickness being substantially equal for each of said first assembly structural members,
      (iv) at least one first subassembly slot in at least one of said first subassembly lengthwise sides of each of said first assembly structural members, each of said first subassembly slots having a first subassembly slot open end, a first subassembly slot closed end, a pair of first subassembly slot parallel sides extending from said first subassembly slot open end to said first subassembly slot closed end, a first subassembly slot axis being parallel to said first subassembly slot parallel sides, each of said first subassembly slots being adapted to be detachably connected to another one of said first subassembly slots in another one of said first subassembly structural members,
   wherein at least one of said first subassembly slots in each of said first subassembly structural members is detachably connected to another one of said first subassembly slots in another one of said first subassembly structural members,
   (b) a second subassembly comprising a plurality of second subassembly structural members, each of said second subassembly structural members comprising:

(i) a second subassembly first lengthwise side and an opposing second subassembly second lengthwise side, said second subassembly lengthwise sides being substantially parallel to each other and substantially equal in length, (ii) a second subassembly first lengthwise side and an opposing second subassembly second widthwise side, said second subassembly widthwise sides being substantially parallel to each other and substantially equal in length, (iii) a second subassembly first planar side and a second subassembly second planar side, said second subassembly planar sides being substantially parallel to each other and defining a second subassembly thickness, said second subassembly thickness being substantially equal for each of said second subassembly structural members, (iv) at least one second subassembly slot in at least one of said second subassembly widthwise sides of each of said second subassembly structural members, each of said second subassembly slots having a second subassembly slot open end, a second subassembly slot closed end, a pair of second subassembly slot parallel sides extending from said second subassembly slot open end to said second subassembly slot closed end, a second subassembly slot axis being parallel to said second subassembly slot parallel sides, each of said second subassembly slots being adapted to be detachably connected to one another of said second subassembly slots in another one of said second subassembly structural members, wherein at least one of said second subassembly slots in each of said second subassembly structural members is detachably connected to another one of said second subassembly slots in another one of said second subassembly structural members, and wherein at least one of said first subassembly slots and at least one of said second subassembly slots are detachably connected to produce an assembled unit.

2. The business reply mail processing system of claim 1, wherein:

a control module is further for:
using the job ID code to access post processing data from the mail campaign job database corresponding to the job ID code, the post processing data containing indications of possible output activities; and
outputting selected ones of the possible output activities by correlating the post processing data and the field data.

3. The system of claim 1 wherein the distance between the closed end of the first subassembly slot and the open end of the first subassembly slot is substantially equal to the distance between the distance between the closed end of the second subassembly slot and the open end of the second subassembly slot.

4. The business reply mail processing system of claim 3, wherein:

if the processing data includes an appropriate instruction, the control module directs the scanner module to obtain an image of the business reply mail piece and stores the image in the mail campaign job database.

5. The business reply mail processing system of claims 4, wherein:

the business reply mail piece further includes a recipient ID code;
the scanner module reads the recipient ID code; and
the control module updates the mail campaign job database to reflect that the business reply mail piece corresponding to a particular recipient has been received.

6. The business reply mail processing system of claim 5, wherein:

a control module is further for:
using the job ID code to access post processing data from the mail campaign job database corresponding to the job ID code, the post processing data containing indications of possible output activities; and
outputting selected ones of the possible output activities by correlating the post processing data and the field data.

7. A method of operating a business reply mail processing system, comprising the step(s) of:

feeding a business reply mail piece in a path of travel, the business reply mail piece including a job ID code and field data thereon;
scanning the business reply mail piece to read the job ID code and the field data;
using the job ID code to access processing data from a mail campaign job database corresponding to the job ID code; and
controlling the scanner module using the processing data to read the field data from the business reply mail piece.

8. The method of claim 7, further comprising the step(s) of:

using the job ID code to access post processing data from the mail campaign job database corresponding to the job ID code, the post processing data containing indications of possible output activities; and
outputting selected ones of the possible output activities by correlating the post processing data and the field data.

9. The method of claim 7, further comprising the step(s) of:

directing the business reply mail piece to a particular one of a plurality of output bins associated with the job ID code.

10. The method of claim 9, further comprising the step(s) of:

if the processing data includes an appropriate instruction, obtaining an image of the business reply mail piece and storing the image in the mail campaign job database.

11. The method of claim 10, further comprising the step(s) of:

reading a recipient ID code from the business reply mail piece; and
updating the mail campaign job database to reflect that the business reply mail piece corresponding to a particular recipient has been received.

12. The method of claim 11, further comprising the step(s) of:

using the job ID code to access post processing data from the mail campaign job database corresponding to the job ID code, the post processing data containing indications of possible output activities; and
outputting selected ones of the possible output activities by correlating the post processing data and the field data.

13. A memory device accessible by a control module, comprising:

a mail campaign database including a plurality of job data sets, each job data set having respective job ID data and respective processing data, the processing data including an appropriate instruction for use in determining whether or not to obtain an image of a business reply mail piece.

14. The memory device of claim 13, wherein:

each job data set further includes post processing data containing indications of possible output activities.

15. The memory device of claim 13, further comprising:

a plurality of records associated with each of the plurality of job data sets, respectively; and wherein the plurality of records includes an indication whether or not the business reply mail piece from a particular recipient has been received.

16. The memory device of claim 15, wherein:

each job data set further includes post processing data containing indications of possible output activities.

17. A business reply mail piece, comprising:

a job ID code; and field data; and wherein:

the job ID code is associated with processing data from a mail campaign job database corresponding to the job ID code; and the processing data includes information for interpreting the field data.

18. The business reply mail piece of claim 17, further comprising:

a recipient ID code corresponding to a particular recipient that the business reply mail piece was provided to.

* * * * *

UNITED STATES PATENT AND TRADEMARK OFFICE
CERTIFICATE OF CORRECTION

PATENT NO.   : 6,459,953 B1                                           Page 1 of 1
DATED        : October 1, 2002
INVENTOR(S)  : Connelly et al.

It is certified that error appears in the above-identified patent and that said Letters Patent is hereby corrected as shown below:

<u>Column 8, lines 27-67 through Column 9, lines 1-39,</u>
Claims 1 and 15 replace as follows:

1. A business reply mail processing system, comprising:
   a transport module for feeding a business reply mail piece in a path of travel, the business reply mail piece including a job ID code and field data thereon;
   a scanner module located adjacent to the path of travel for scanning the business reply mail piece to read the job ID code and the field data; and
   a control module in operative communication with the scanner module and including a mail campaign job database, the control module for:
       using the job ID code to access processing data from the mail campaign job database corresponding to the job ID code; and
       controlling the scanner module using the processing data to read the field data from the business reply mail piece.

<u>Column 9,</u>
Lines 50-55, Claim 3 is replaced as follows:

3. The business reply mail processing system of claim 1, further comprising:
   a plurality of output bins located downstream in the path of travel from the scanner module; and
   wherein the control module directs the business reply mail piece to a particular one of the plurality of output bins associated with the job ID code.

Signed and Sealed this

Eighth Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,459,953 B1
DATED : October 1, 2002
INVENTOR(S) : Connelly et al.

It is certified that error appears in the above-identified patent and that said Letters Patent is hereby corrected as shown below:

Column 8, lines 27-67 through Column 9, lines 1-39,
Claim 1 is replaced as follows:

1. A business reply mail processing system, comprising:
    a transport module for feeding a business reply mail piece in a path of travel, the business reply mail piece including a job ID code and field data thereon;
    a scanner module located adjacent to the path of travel for scanning the business reply mail piece to read the job ID code and the field data; and
    a control module in operative communication with the scanner module and including a mail campaign job database, the control module for:
        using the job ID code to access processing data from the mail campaign job database corresponding to the job ID code; and
        controlling the scanner module using the processing data to read the field data from the business reply mail piece.

Column 9,
Lines 50-55, Claim 3 is replaced as follows:

3. The business reply mail processing system of claim 1, further comprising:
    a plurality of output bins located downstream in the path of travel from the scanner module; and
    wherein the control module directs the business reply mail piece to a particular one of the plurality of output bins associated with the job ID code.

This certificate supersedes Certificate of Correction issued July 8, 2003.

Signed and Sealed this

Twenty-ninth Day of June, 2004

JON W. DUDAS
*Acting Director of the United States Patent and Trademark Office*